United States Patent
Crowe et al.

(10) Patent No.: US 10,257,043 B2
(45) Date of Patent: Apr. 9, 2019

(54) BALANCING UTILIZATION OF INFRASTRUCTURE IN A NETWORKED COMPUTING ENVIRONMENT

(71) Applicant: LENOVO ENTERPRISE SOLUTIONS (SINGAPORE) PTE. LTD., Singapore (SG)

(72) Inventors: John S. Crowe, Durham, NC (US); Gary D. Cudak, Wake Forest, NC (US); Jennifer J. Lee-Baron, Morrisville, NC (US); Nathan J. Peterson, Durham, NC (US); Amy L. Rose, Chapel Hill, NC (US); Bryan L. Young, Tualatin, OR (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 381 days.

(21) Appl. No.: 14/992,395

(22) Filed: Jan. 11, 2016

(65) Prior Publication Data

US 2017/0201423 A1    Jul. 13, 2017

(51) Int. Cl.
*G06F 15/173*   (2006.01)
*H04L 12/24*    (2006.01)
*H04L 12/26*    (2006.01)
*H04L 12/861*   (2013.01)

(52) U.S. Cl.
CPC .......... *H04L 41/12* (2013.01); *H04L 43/0876* (2013.01); *H04L 49/90* (2013.01)

(58) Field of Classification Search
CPC ...... H04L 41/12; H04L 43/0876; H04L 49/90
USPC ................................................. 709/223, 224
See application file for complete search history.

(56) References Cited

U.S. PATENT DOCUMENTS

| | | | |
|---|---|---|---|
| 7,711,980 B1* | 5/2010 | Scarpello, Jr. | G06F 11/0709 714/10 |
| 9,818,136 B1* | 11/2017 | Hoffberg | G06Q 30/0282 |
| 2006/0190602 A1* | 8/2006 | Canali | H04L 29/06 709/226 |
| 2006/0235873 A1 | 10/2006 | Thomas | |
| 2007/0043860 A1* | 2/2007 | Pabari | G06F 9/5072 709/224 |

(Continued)

OTHER PUBLICATIONS

Weil et al., "Crush: Controlled, Scalable, Decentralized Placement of Replicated Data", University of California, Santa Cruz, Nov. 2006, Tampa, Florida, USA, http://ceph.com/papers/weil-crush-sc06.pdf, Last visited Jan. 13, 2016.

(Continued)

*Primary Examiner* — Thu Ha T Nguyen

(57) ABSTRACT

Disclosed are embodiments for balancing utilization of infrastructure in a networked computing environment. One example embodiment includes: mapping, for each of a plurality of workloads operating on source devices in a networked computing environment, a corresponding target device within said networked computing environment; accessing topological information defining the networked computing environment; and reducing unbalanced utilization of infrastructure in the networked computing environment including migrating a workload to an alternate device within the networked computing environment, in dependence upon the mapping and topological information.

17 Claims, 12 Drawing Sheets

(56) References Cited

U.S. PATENT DOCUMENTS

| | | | | |
|---|---|---|---|---|
| 2008/0016198 | A1* | 1/2008 | Johnston-Watt | H04L 67/104 709/223 |
| 2009/0119396 | A1* | 5/2009 | Kanda | H04L 47/10 709/223 |
| 2010/0322088 | A1* | 12/2010 | Muthiah | G06F 9/5055 370/252 |
| 2011/0010518 | A1* | 1/2011 | Kavuri | G06F 3/0647 711/165 |
| 2012/0166630 | A1* | 6/2012 | Cho | G06F 9/5083 709/224 |
| 2012/0210382 | A1* | 8/2012 | Walker | G06F 17/30017 725/115 |
| 2012/0254111 | A1* | 10/2012 | Carmichael | G06F 17/30094 707/627 |
| 2012/0317276 | A1* | 12/2012 | Muniraju | H04L 41/14 709/224 |
| 2013/0007254 | A1* | 1/2013 | Fries | H04L 43/0876 709/224 |
| 2013/0304903 | A1* | 11/2013 | Mick | H04L 43/0817 709/224 |
| 2014/0059207 | A1* | 2/2014 | Gulati | G06F 9/505 709/224 |
| 2014/0181834 | A1* | 6/2014 | Lim | G06F 9/5088 718/105 |
| 2014/0359043 | A1 | 12/2014 | Gao et al. | |
| 2015/0092561 | A1* | 4/2015 | Sigoure | H04L 49/50 370/236 |
| 2015/0312335 | A1* | 10/2015 | Ying | H04L 67/1061 709/201 |
| 2015/0381453 | A1* | 12/2015 | Skjolsvold | H04L 43/0876 709/224 |
| 2016/0170668 | A1* | 6/2016 | Mehra | G06F 3/0619 711/165 |
| 2016/0330245 | A1* | 11/2016 | Bell | H04L 63/0823 |
| 2016/0352866 | A1* | 12/2016 | Gupta | H04L 67/42 |
| 2017/0193136 | A1* | 7/2017 | Prasad | G06F 17/505 |
| 2017/0199877 | A1 | 7/2017 | Cosby et al. | |
| 2017/0201423 | A1* | 7/2017 | Crowe | H04L 41/12 |
| 2017/0315836 | A1* | 11/2017 | Langer | H04L 43/0882 |

OTHER PUBLICATIONS

Lazarev, "Improving Data Processing Performance with Hadoop Data Locality", Mirantis, Feb. 28, 2014, https://www.mirantis.com/blog/improving-data-processing-performance-hadoop-data-locality/, Last visited Jan. 13, 2016.

Nystrom, Game Programming Patterns, Genever Benning, 2014, Section 6, Chapter 17 "Data Locality", http://gameprogrammingpatterns.com/contents.html, Last visited Jan. 13, 2016.

Giannoules, "ProxStor: Flexible Scalable Proximity Data Storage & Analysis", University of Texas at Austin, Dec. 2014, https://repositories.lib.utexas.edu/bitstream/handle/2152/28536/GIANNOULES-MASTERSREPORT-2014.pdf?sequence=1&isAllowed=y, Last visited Jan. 13, 2016.

* cited by examiner

Unbalanced Mapping Table 220

| Workload Source Device | Workload Target Device |
|---|---|
| Switch 203-1 | Rack 200-1 |
| Switch 203-1 | Rack 200-2 |
| Switch 203-1 | ... |

Row 222, Row 224, Row 226
Column 228, Column 229

Balanced Mapping Table 230

| Workload Source Device | Workload Target Device |
|---|---|
| Switch 203-1 | Rack 200-1 |
| Switch 203-2 | Rack 200-2 |
| Switch 203-X | Rack 200-Q |
| ... | ... |

Row 222, Row 224, Row 226
Column 228, Column 229

FIG. 2C

Unbalanced Topology Utilization Table 280

| Ancestor | Descendent | Utilization |
|---|---|---|
| Switch 203-1 | Switch 202-1 | 3 |
| Switch 202-1 | Switch 201-1 | 2 |
| Switch 201-1 | Rack 200-1 | 2 |
| Switch 202-1 | Switch 201-2 | 1 |
| Switch 201-2 | Rack 200-2 | 1 |
| Switch 203-2 | Switch 202-2 | 0 |
| Switch 202-2 | Switch 201-2 | 0 |
| Switch 202-2 | Rack 200-2 | 0 |
| ... | ... | ... |
| Switch 203-X | Switch 201-(Y-1) | 0 |
| Switch 202-(Y-1) | Switch 201-(Z-1) | 0 |
| Switch 201-(Z-1) | Rack 200-Q | 0 |
| ... | ... | ... |

Row 250, Row 252, Row 254, Row 256, Row 258, Row 260, Row 262, Row 264, Row 266, Row 268, Row 270

Column 272, Column 274, Column 276

Balanced Topology Utilization Table 290

| Ancestor | Descendent | Utilization |
|---|---|---|
| Switch 203-1 | Switch 202-1 | 1 |
| Switch 202-1 | Switch 201-1 | 1 |
| Switch 201-1 | Rack 200-1 | 1 |
| Switch 202-1 | Switch 201-2 | 1 |
| Switch 201-2 | Rack 200-2 | 1 |
| Switch 203-2 | Switch 202-2 | 1 |
| Switch 202-2 | Switch 201-2 | 1 |
| Switch 202-2 | Rack 200-2 | 1 |
| ... | ... | ... |
| Switch 203-X | Switch 201-(Y-1) | 1 |
| Switch 202-(Y-1) | Switch 201-(Z-1) | 1 |
| Switch 201-(Z-1) | Rack 200-Q | 1 |
| ... | ... | ... |

Row 250, Row 252, Row 254, Row 256, Row 258, Row 260, Row 262, Row 264, Row 266, Row 268, Row 270

Column 272, Column 274, Column 276

FIG. 2D

BALANCING UTILIZATION OF INFRASTRUCTURE IN A NETWORKED COMPUTING ENVIRONMENT

BACKGROUND OF THE INVENTION

Field of the Invention

The field of the invention is data processing, or, more specifically, methods, apparatus, and computer program products for balancing utilization of infrastructure in a networked computing environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancement includes data centers with sophisticated network architectures designed to handle massive network communication loads. However, problems still exist in utilizing network resources in a balanced and efficient manner.

SUMMARY OF THE INVENTION

Disclosed are embodiments for balancing utilization of infrastructure in a networked computing environment. One embodiment includes: mapping, for each of a plurality of workloads operating on source devices in a networked computing environment, a corresponding target device within said networked computing environment; accessing topological information defining the networked computing environment; and reducing unbalanced utilization of infrastructure in the networked computing environment including migrating a workload to an alternate device within the networked computing environment, in dependence upon the mapping and topological information.

The foregoing and other features, aspects, and details are described in the Detailed Description, and as illustrated in the accompanying drawings, where like reference numbers generally represent like parts of the disclosed embodiments.

BRIEF DESCRIPTION OF THE DRAWINGS

FIG. 2C depicts tables that represent mappings between source devices and target devices according to an embodiment.

FIG. 2D depicts tables that are each representative of the network topology of the networked computing environment, and representative of device utilization data for the networked computing environment according to an embodiment.

DETAILED DESCRIPTION

Embodiments of methods, apparatus, and computer program products for balancing utilization of infrastructure in a networked computing environment are described with reference to the accompanying drawings, beginning with FIG. 1.

Figure 1:
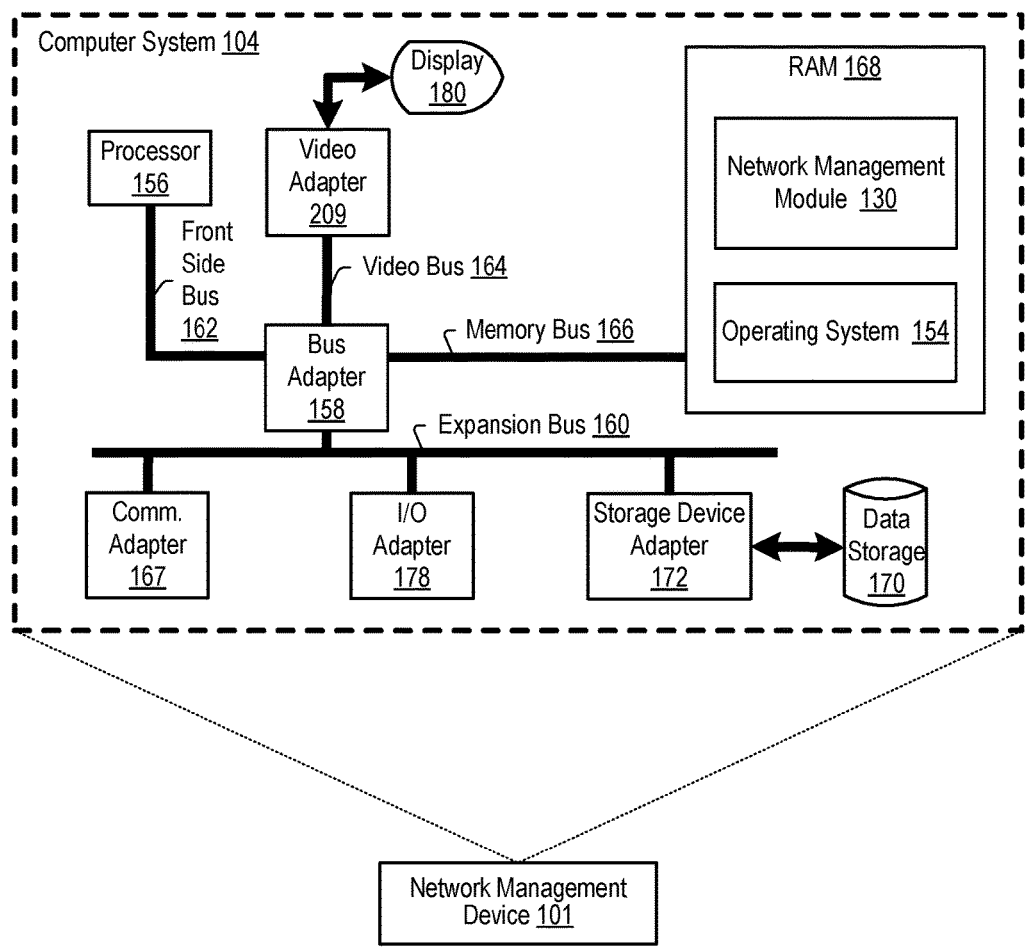
FIG. 1 illustrates a network management device configured for balancing utilization of infrastructure in a networked computing environment according to an embodiment.

Turning now to FIG. 1, a network management device (101) of FIG. 1 includes a network management module (130) which may be configured for balancing utilization of infrastructure in a networked computing environment.

A networked computing environment may be local area network (LAN). According to some embodiments, a networked computing environment could constituting an entire data center or a subset thereof. A data center may provide servers for hosting web sites. A web server application may request data (e.g., a web page) stored on another server in the data center. Such application would be a source of data requests, the server on which the application is running would be a 'source device', and the stored web page would constitute target data stored on target storage devices. Given recorded patterns for infrastructure used—for example, how source devices and target devices are paired for different workloads—the network management device (101) may determine that a migration of a workload from one source device to another, or a migration of a workload from one target device to another, would improve balanced utilization of the infrastructure of the data center.

Generally, a networked computing environment (NCE) may provide resources for satisfying accesses (e.g., requests for data) from workload sources to workload targets. A workload source, or 'workload,' may run entirely within an NCE, such as the example web server application running on a server within a data center as described above. Alternatively, a workload may execute on a host device outside of the NCE, where a 'source device' within the NCE would receive a query from the host, and direct such query to an appropriate 'target device' within the NCE to provide data or application services. For example, a host device (206) may be a mobile device running a source application ("app"), and may send a request for data over a network (205), such as the Internet, to the NCE (208) within a data center. Further, a workload may correspond to a source device, which may be a device which first receives and handles a request for data or services within the NCE from the workload. A workload target may be data or a service such as an executing application stored or implemented on a target device within the NCE.

For example, a source device may be a network device that receives incoming requests from workloads on one or more host computers, where the host computers may be requesting data services such as requests for data storage access or requests for services or data from a computer application executing on a target device or devices. In some cases, a target device or source device may be similarly configured, and are distinguished by a location along a data communications path within the NCE. A source device may also be implemented as a computing device that executes a workload, such as a database application or web services server. Similarly, for example, in the case that a workload target is data, a target device can be a storage device within the NCE, where the target device stores the workload target. In other examples, a workload target may be a computer application executed by a target device or devices within the NCE, where the workload target is an application that may provide a computational service.

The network management device (101) may be configured to provide management services for a given NCE. For example, the network management device (101) may communicate with any other device within an NCE to modify routing of data communications between devices in the NCE, to initiate migrations of workload target such as storage data or applications from one network device to another network device, to modify a queue of jobs to be performed within the NCE, or to generally modify characteristics of devices within the NCE.

For a workload that corresponds to a current source device, migration of the workload may include the network management device (101) specifying a different source device to be the first device to receive and handle a request for data or services. Similarly, migration of a workload target may include the network management device (101) transferring data or applications to be stored or executed from a different target device.

An NCE may include workloads, source devices, workload targets, target devices, and any network hardware such as network switches, routers, storage controllers, storage devices, servers, cabling, or more generally, any network device or network equipment—where the NCE may be configured to receive requests for data or services and to generate responses to requests for data or services. An NCE may be implemented as a data center, but more generally, an NCE may be implemented within any computing environment providing computing services or data services over a network—including cloud services, high performance computing services, local networks, among others.

The network management device (101) may provide a user interface from which a system administrator or user may access and modify characteristics of devices within the NCE. In other cases, the network management device (101) may provide an application programming interface (API) to system management software, where the system management software provides a user interface from which a system administrator or user may access and modify characteristics of devices within the NCE.

The network management device (101) may determine a network topology describing connections or relationships between devices that are part of an NCE using different techniques. The network topology may describe a hierarchy of network devices, including connections between the network devices, and the network management device (101) may determine a network topology based at least in part on configuration data describing the NCE. In other examples, a network topology may be determined through an analysis of data communications among the network devices of the NCE. For example, a data communication between two devices may provide information that the two devices are communicatively coupled or linked.

The network management device (101) may determine a network topology through communicating with a management entity within the NCE, where the management entity may provide the topological information for the NCE to the network management device (101).

The network topology may be represented in different ways. For example, the network topology can be represented as a directed graph, where devices within the NCE may be represented as nodes within the graph, and where links within the graph may indicate connections or communication paths between devices. In this way, the network management device (101) may determine which network resource may be available to provide storage or data services, which network paths are available between devices, and which devices may be available through which data communications may be routed.

Further, the data communications may be used to determine mappings between source devices and target devices. For example, given a set of data communications, the network management device (101) may map source devices to target devices—where the mapping of the source device to the target device may correspond to a workload request being routed along a network path which includes the source device and the target device. In this way, each data communication may provide information on mappings between devices of the NCE corresponding to communications between workloads and workload targets.

Topological information may be used to determine alternative devices or routes to use in order to balance infrastructure utilization. In other words, both topological information and existing mappings between source devices and target devices may be used in determining whether routes between source devices and target devices should be modified, whether workloads should be migrated to other source devices, whether workload targets should be migrated to other target devices, or some combination of migrating workloads, workload targets, and modifying routes.

As one example, a workload $S_1$ may correspond to a source device $SD_1$, and a workload target $T_1$ may correspond to a target device $TD_1$, where the source device $SD_1$ may be mapped to target device $T_1$, and this mapping may be based on data communications routed through devices $\{SD_1, A, B, TD_1\}$. Similarly, a workload $S_2$ may correspond to source device $SD_2$, and a workload target $T_2$ may correspond to target device $TD_1$, where the source device $SD_2$ may be mapped to target device $TD_1$, and this mapping may be based on data communications routed through devices $\{SD_2, A, B, TD_1\}$. In other words, both workload target $T_1$ and workload target $T_2$ are located on target device $TD_1$, and accesses from workload $S_1$ to workload target $T_1$ and from workload $S_2$ to workload target $T_2$ both use intermediary devices A and B.

Further in this example, if the network management device (101) determines, based on the topological information of the NCE, that route $\{SD_2, M, N, TD_2\}$ is a possible route and less utilized or relatively less utilized than $\{SD_2,$ A, B, TD$_1$}, then the network management device (101) can determine, based at least on both workload targets being mapped to a same target device, that the utilization of the infrastructure of the NCE may be balanced by migrating the workload target T$_2$ onto target device TD$_2$, such that subsequent access from workload S$_2$ to workload target T$_2$ utilize devices {SD$_2$, M, N, TD$_2$} instead of {SD$_2$, A, B, TD$_1$}, and accesses from workload 51 to workload target T$_1$ use intermediary devices A and B, while access from workload S$_2$ to workload target T$_2$ use intermediary devices M and N.

In this way, the topological information and mapping data between source devices and target devices may be used to balance utilization of the infrastructure of an NCE.

However, instead of or in addition to using mapping data, device utilization data may be used to balance utilization of the infrastructure of an NCE. For example, based at least on data communications within the NCE, a utilization of devices in accessing given workload targets may be determined.

For example, the network management device (101) may determine utilization measures of an NCE, and use the utilization measures, without using mapping data, as a basis for determining whether routes from source devices to target devices should be modified, whether workloads should be migrated to other source devices, whether workload targets should be migrated to other target devices, or some combination of migrating data, migrating applications, and modifying routes.

The network management device (101) may also analyze records of previous data communications between workloads that may be mapped to workload targets, including times of access, length of job requests, and data describing routes through the NCE, where a given route or network path may be described to be one or more network devices used in satisfying a given request from a workload, including switches, racks, servers, or any other network device used. In this way, the network management device (101) may use this utilization data to determine points in time during which to schedule migrations of workload targets, or to otherwise make modifications to routing tables, or other characteristics of the NCE.

In addition to migrating workload targets or workloads, or changing routing tables, or as an alternative to migrating workload targets or workloads, or changing routing tables, the network management device (101) may use analytics data describing patterns of access to determine how to schedule jobs in a queue—where the jobs may correspond to access requests from workloads to workload targets. In this way, in cases where migration of workloads, workload targets, or routing modifications does not balances, or minimally balances, infrastructure utilization of an NCE, job scheduling modifications may provide balanced utilization by rescheduling a job that may otherwise overload a device by conflicting with another job, to be performed at a different time.

For example, analytics data may be collected for previous jobs from a workload to a workload target, with the analytics data describing characteristics such as, for example, quantity of data accessed, time of access, duration of time to complete the job, among other information characterizing the performance of the job. This analytics data may then serve, for jobs that may be deployed in parallel, as a basis for reordering jobs within a queue depending on which resources within the topology are expected to be used by different jobs. For example, if two jobs are within a queue, and both jobs access at least one common device or resource within the NCE, then the network management device (101) may reorder either or both jobs such that, given expected resource usage of the two jobs, the new order of the jobs within the queue may eliminate or reduce overlaps in resource usage in performing the two jobs.

The network management device (101) of FIG. 1 is for purposes of illustration, not for limitation. Similarly, an NCE according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

Balancing utilization of infrastructure in an NCE is generally implemented with computers, that is, with automated computing machinery. In the computer system of FIG. 1, for example, the computer system (104) may be implemented using one or more computer hardware processors. For further explanation, therefore, FIG. 1 illustrates a block diagram of automated computing machinery comprising an embodiment of a computer system (104) configured for balancing utilization of infrastructure in an NCE. The computer system (104) includes at least one computer processor (156) or "CPU" as well as random access memory (168) or "RAM," which is connected through a high speed memory bus (166) and bus adapter (158) to processor (156) and to other components of the computer system (104).

Stored in RAM (168) is a network management module (130), a module of computer program instructions improved for balancing utilization of infrastructure in an NCE according to various embodiments. The network management module (130) for example may, when executed, cause the network management module to carry out the steps of: for each of a plurality of source devices: determining a mapping of the source device to a target device, wherein the mapping is based at least in part on an access from a workload to a workload target corresponding to data communication between the source device and the target device; obtaining topological information defining a topology of a network of the NCE; and reducing unbalanced utilization of infrastructure in the NCE including migrating, in dependence upon the topological information and upon the mappings of source devices to target devices, at least one of the workloads or at least one of the workload targets.

Also stored in RAM (168) is an operating system (154). Operating systems useful in computers configured for balancing utilization of infrastructure in an NCEs according to various embodiments include UNIX™, Linux™, Microsoft XP™, AIX™, IBM's i5/OS™, and others as will occur to those of skill in the art. The operating system (154) and network management module (130) are shown in RAM (168), but many components of such software may typically be stored in non-volatile memory such as, for example, on a data storage (170) device.

The computer system (104) may also include a storage device adapter (172) coupled through expansion bus (160) and bus adapter (158) to processor (156) and other components of the computer system (104). Storage device adapter (172) connects non-volatile data storage to the computer system (104) in the form of data storage (170). Storage device adapters useful in computers configured for balancing utilization of infrastructure in an NCEs according to various embodiments include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer system (104) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computer system (104) may also include a video adapter (209), which may be an example of an I/O adapter specially designed for graphic output to a display device (180) such as a display screen or computer monitor. Video adapter (209) may be connected to processor (156) through a high speed video bus (164), bus adapter (158), and the front side bus (162), which may also be a high speed bus.

The computer system (104) may also include a communications adapter (167) for data communications with other computers or devices (not shown) and for data communications with a data communications network. Such data communications may be carried out serially through RS-232 connections, through external buses such as a Universal Serial Bus ("USB"), through data communications networks such as IP data communications networks, and in other ways as will occur to those of skill in the art. Communications adapters may implement the hardware level of data communications through which one computer sends data communications to another computer, directly or through a data communications network. Examples of communications adapters useful in computers configured for balancing utilization of infrastructure in an NCE according to various embodiments include modems for wired dial-up communications, Ethernet (IEEE 802.3) adapters for wired data communications, and 802.11 adapters for wireless data communications.

Turning now to FIGS. 2A-2D illustrated is a networked computing environment (208) within which an embodiment for balancing utilization of infrastructure in an NCE may be implemented, and tables that represent mappings between source devices and target devices according to some embodiments, where the mapping data may be used in balancing utilization of infrastructure in an NCE, and tables that are each representative of the network topology of the NCE (208), and representative of device utilization data for the NCE (208) according to some embodiments, where the device utilization data may be used in balancing utilization of infrastructure in an NCE.

Figure 2A:
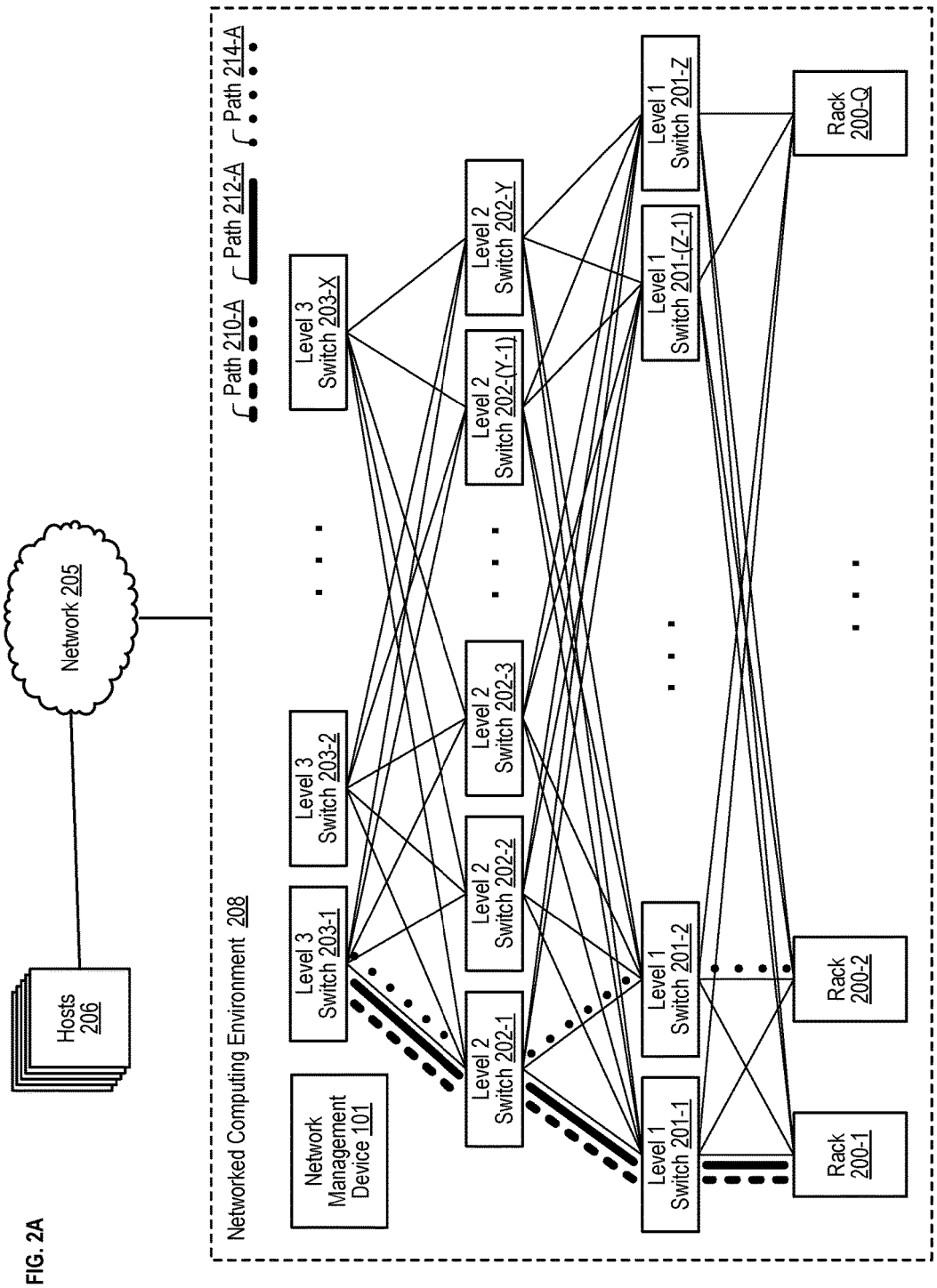
FIG. 2A illustrates a networked computing environment within which an embodiment for balancing utilization of infrastructure in a networked computing environment may be implemented.

Depicted in FIG. 2A is a networked computing environment (208) which includes is an example arrangement of devices and connections between devices. As depicted, there is a three level network architecture, which includes levels for switches and a level for racks of devices. At a top level, level 3, are switches (203-1, 203-2 . . . 203-X); at a second level are switches (202-1, 202-2, 202-3 . . . 202-(Y−1), 202-Y); and at the first level are switches (201-1, 201-2 . . . 201-(Z−1), 201-Z). Further included within the NCE (208) are multiple racks, racks (200-1, 200-2 . . . 200-Q). In this example, each switch at level 3 is connected to one or more of the switches at level 2; each switch at level 2 is connected to one or more of the switches at level 1; and each of the switches at level 1 is connected to one or more of the racks, which may house one or more servers, storage devices, or other devices providing data or application services. Further in this example, a given rack may include one or more servers or other devices that store workload targets such as stored data or executing applications providing data services.

In this example, as illustrated by the NCE (208) before balancing utilization of infrastructure in FIG. 2A, is a depiction of three routes, or data communication paths, from workloads to workload targets that have been previously recorded. As depicted in FIG. 2A, these three data communication paths are depicted as paths (210-A), (212-A), and (214-A). A given route mapped to the network topology of the NCE (208) may correspond to a data communication path from a given workload mapped to a given workload target. In different embodiments, data communication paths may be recorded by the network management device (101).

For example, in FIG. 2A, path (210-A), which represents a path that includes {level 3 switch (203-1), level 2 switch (202-1), level 1 switch (201-1), rack (200-1)}, may correspond to a communication path or route that is utilized in satisfying an access from a first workload to a first workload target. Similarly, path (212-A), which represents a path that includes {level 3 switch (203-1), level 2 switch (202-1), level 1 switch (201-1), rack (200-1)}, may correspond to a communication path or route that is utilized in satisfying an access from a second workload to a second workload target; and path (214-A), which represents a path that includes {level 3 switch (203-1), level 2 switch (202-2), level 1 switch (201-2), rack (200-2)}, may correspond to a communication path or route that is utilized in satisfying an access from a third workload to a third workload target. In this example, designations of "first," "second," and "third," are intended to convey relative distinctions and not to convey a particular order.

In this example, prior to balancing utilization of the infrastructure of the NCE (208), the three accesses from workloads to workload targets utilize the same level 3 switch, the same level 2 switch. Further, two of the accesses further access the same level 1 switch and rack. In short, in this example, there is an imbalanced utilization of infrastructure of the NCE (208) because it may be possible—based at least on the structure of the network topology and on an analysis of the utilization of the infrastructure of the NCE (208)—to migrate workloads, workload targets, or both workloads and workload targets, within the NCE (208).

FIG. 2C depicts two tables of mapping data that, in some embodiments, may be used in addition to topological information for the NCE (208) to balance utilization of the infrastructure of an NCE.

As depicted in FIG. 2C, unbalanced mapping table (220) is representative of mapping data based on data communications in FIG. 2A. Further as depicted, balanced mapping table (230) is representative of mapping data based on data communications in FIG. 2B.

In this example, with regard to FIG. 2A and unbalanced mapping table (220), a mapping of switch (203-1) to rack (200-1) may be determined based on an access from a first workload to a first workload target that corresponds to the data communication along path (210-A), which includes switch (203-1) as a source device and rack (200-1) as a target device. In this example, this mapping is represented in row (222) and columns (228) and (229) of table (220).

Similarly, a mapping of switch (203-1) to rack (200-1) may be determined based on an access from a second workload to a second workload target that corresponds to the data communication along path (212-A), which includes switch (203-1) as a source device and rack (200-1) as a target device. In this example, this mapping is represented in row (224) and columns (228) and (229) of table (220).

Similarly, a mapping of switch (203-1) to rack (200-2) may be determined based on an access from a third workload to a third workload target that corresponds to the data communication along path (214-A), which includes switch (203-1) as a source device and rack (200-2) as a target device. In this example, this mapping is represented in row (226) and columns (228) and (229) of table (220).

In this way, based on accesses from workloads to workload targets, which correspond to data communication paths through the NCE, a plurality of mappings between source devices and target devices may be determined.

As discussed above, a graph corresponding to topological information defining a network topology may be represented by a table, with row entries corresponding to each connection between nodes the graph, where the nodes may correspond to devices within the NCE (208) and the connections between nodes of the graph correspond to communication links between devices. In this way, the network management device (101) may use the table representative of the network topology to identify alternative mappings between source devices and target devices.

For example, given a table representing the network topology of the NCE (208), the network management device (101) may determine, based at least on referencing the existing mappings between source devices and target devices, that mappings between potential source devices and target devices are not already being utilized. In this example, these potential alternative mappings may include {switch (203-2):rack (200-Q)}, {switch (203-X):rack (200-Q)}, among other mappings between level 3 switches potentially serving as source devices and rack level devices serving as target devices. Given a list of alternative, and less utilized, mappings between source devices and target devices, the network management device (101) may then select an existing mapping from the unbalanced mapping table (220) in order to migrate the source device, the target device, or both the source device and the target device. In some cases, relatively less utilization of mappings may be determined by potential mappings, within a list of possible mappings, not being present within the existing mappings table (220).

The existing mapping selection may be based on the existing mapping being listed in the unbalanced mapping table (220) more than once, which indicates that more than one workload and workload target correspond to, and therefore utilize, the same source device and target device. In other cases, the existing mapping selection may be based on the existing mapping having one device in common with another mapping entry. For example, in unbalanced mapping table (220), mapping entry at row (224) indicates a source device switch (203-1) is mapped to target device rack (200-1), and mapping entry at row (226) indicates a source device switch (203-1) is mapped to target device (200-2). In this example, only the source device is shared between these two mappings, however, this existing mapping may be selected for migration because doing so would eliminate distribute, and therefore balance, utilization of the infrastructure of the NCE (208) among different devices. The network management device (101) may migrate workloads to other source devices, migrate workload targets to other target devices, or both, until either all mapping entries, both source devices and target devices, are distinct from each other, or until the redundancies are reduced or minimized given a constraint of possible alternative mappings of source devices to target devices as indicated by a representation of the network topology.

The topological information for the NCE (208) may be used, along with the mapping data, to reduce unbalanced utilization of infrastructure in the NCE (208). Such an example is discussed below with regard to FIG. 3.

Further as depicted in FIG. 2C, is a balanced mapping table (230), which may be a result of balancing utilization of the infrastructure of the NCE (208), as described with regard to FIG. 3. In this example, table (230) is representative of mapping data based on data communications in FIG. 2B. As noted above, balanced mapping table (230) is representative of mapping data based on data communications in FIG. 2B, where the data communications in FIG. 2B are similar to those in FIG. 2A, except where the data communications in FIG. 2B occur after balancing.

Figure 2B:
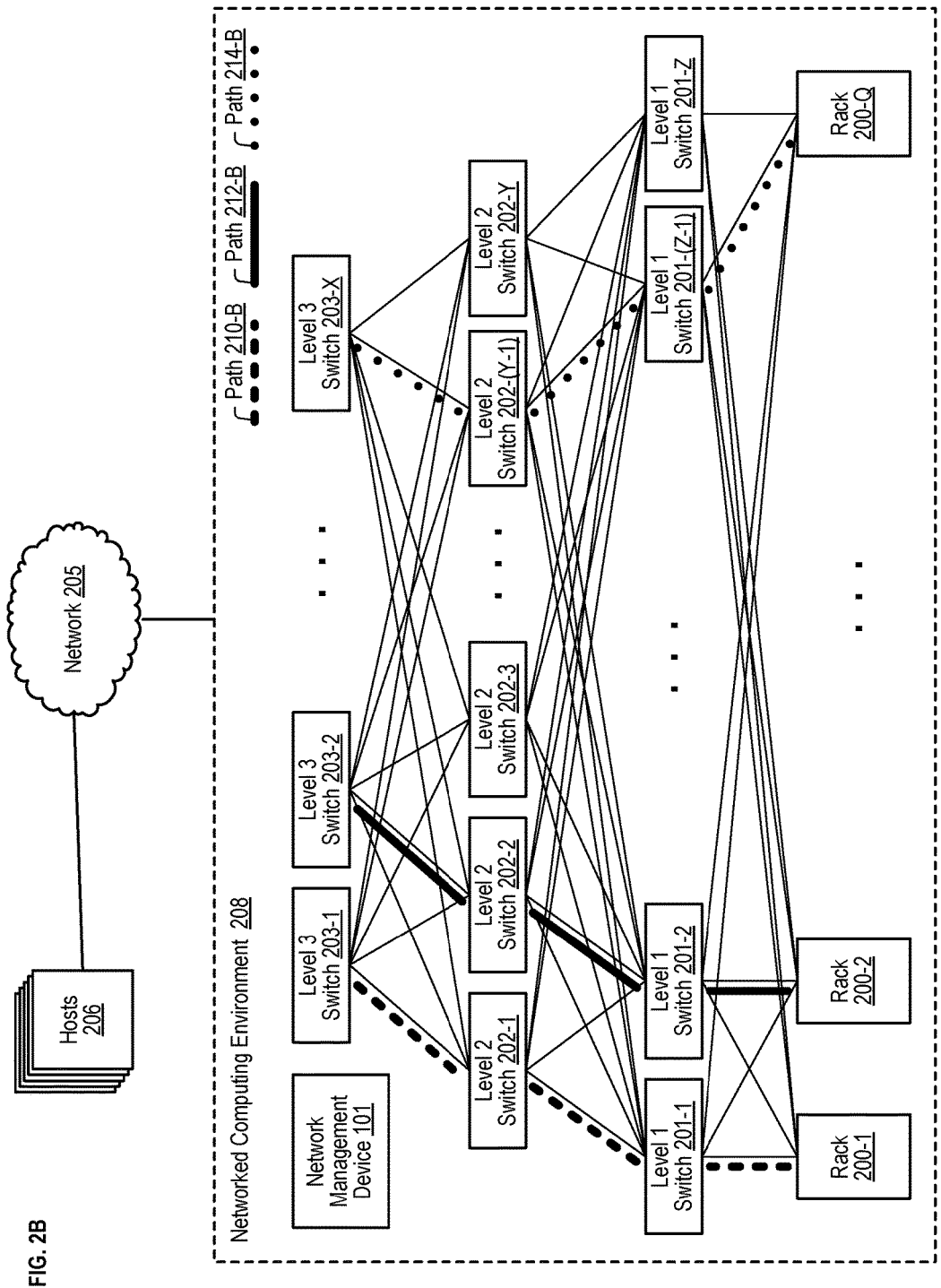
FIG. 2B illustrates a networked computing environment within which an embodiment for balancing utilization of infrastructure in a networked computing environment may be implemented.

In this example, with regard to FIG. 2B and balanced mapping table (230), a mapping of switch (203-1) to rack (200-1) may be determined based on an access from a first workload to a first workload target that corresponds to the data communication along path (210-B), which includes switch (203-1) as a source device and rack (200-1) as a target device. In this example, this mapping is represented in row (222) and columns (228) and (229) of table (230).

Similarly, a mapping of switch (203-2) to rack (200-2) may be determined based on an access from a second workload to a second workload target that corresponds to the data communication along path (212-B), which includes switch (203-2) as a source device and rack (200-2) as a target device. In this example, this mapping is represented in row (224) and columns (228) and (229) of table (230).

Similarly, a mapping of switch (203-X) to rack (200-Q) may be determined based on an access from a third workload to a third workload target that corresponds to the data communication along path (214-B), which includes switch (203-X) as a source device and rack (200-Q) as a target device. In this example, this mapping is represented in row (226) and columns (228) and (229) of table (230).

In this way, through migrations of workloads and workload targets, a balancing of the utilization of infrastructure of networked computing environment (208) is produced. In other examples, balancing utilization may be performed through a different combination of migrations or sources, targets, modifications to routing, or some combination of migrations and modifications.

However, as discussed above, instead of, or in addition to using mapping data, device utilization data may be used to balance utilization of the infrastructure of an NCE. For example, based at least on data communications within the NCE, a utilization of devices in accessing given workload targets from given workloads may be determined.

As depicted in FIG. 2D, each row of the table may represent a communication link between an ancestor device and a descendent device, and where the three columns of the table may include one column for ancestors, one column for descendants, and one column to indicate a utilization of the connection between an ancestor device and descendant device in the corresponding row. As noted above, utilization of a connection between devices of networked computing environment (208) may correspond to a route for a data communication path corresponding to an access from a workload to a workload target.

Further in this example, and as depicted in FIG. 2D, unbalanced topology utilization table (280) may correspond to the unbalanced state of the NCE (208) depicted in FIG. 2B. As noted above, for the three example accesses from workloads to workload targets, all three accesses utilize the same communication link from a level 3 switch to a level 2 switch, represented in table (280) by row (250), which includes a column (272) entry for listing an ancestor device, in this case, switch (203-1), a column (274) entry for listing a descendant device, in this case, switch (202-1), and a column (276) entry for listing a measure of utilization, in this case, three (3) uses. Similarly, table (280) has entries for rows (252, 254, 256, 258) for representing the utilizations of infrastructure as the utilization corresponds to the network topology represented in the table (280). In this example, rows (260, 264, 266, 268, 270), and each other row of the table (280) may represent the network topology of the NCE (208). In other words, building a network topology using the row and column entries of the table (280) would result in a network topology representing each device and each connection between devices in the network infrastructure of the NCE (208).

As an additional note, table (280), while providing device utilization data, is also representative of the network topology of networked computing environment (208) since each device and each connection between devices is represented by a row entry. Further, a route or path from a source device to a workload target may be determined by successively indexing ancestor devices. For example, starting with a given device, the descendant device may be determined, and the descendant device may then be indexed within the table at a row where the descendant device is an ancestor device, and this process may continue until a leaf device, or a device with no descendant devices is reached.

By contrast to the unbalanced utilization illustrated by FIG. 2A, and as illustrated by the NCE (208) after balancing utilization of infrastructure, FIG. 2B depicts three routes, or data communication paths, from workloads to workload targets that may occur—where the three routes in FIG. 2B correspond to similar accesses from workloads to workload targets depicted in FIG. 2A.

Balancing may include the network management device (101) identifying alternative workloads within the table (280) that correspond to lower utilization measures than the utilization measures for the previously measured utilizations of data communications that include a source device; identifying alternative targets within the table (280) that correspond to lower utilization measures than the utilization measures for the previously measures utilizations of data communications that include the target device; and identifying intermediary devices in the network topology that may provide a route from one or more of the alternative source devices to one or more of the target devices—where the alternative intermediary devices are identified based on lower utilization measures in the table (280) than the utilization measures for previously measured utilizations of data communications.

Given the determination of at least one alternative source device, at least one alternative target device, or at least one alternative route through one or more alternative intermediary devices, then the network management device (101) may migrate the workload target onto the alternative target device, and may also update routing table data to route subsequent accesses from the workload to the workload target to be routed through the alternative source device to the alternative target device through the alternative route through the one or more intermediary devices. In this way, subsequent access from a workload to a workload device may utilize infrastructure in a more balanced way than prior to balancing.

Depending on utilization measures of previous data communications paths, only the workload target may be migrated, only the workload may be defined to be routed through another source device, only the intermediary devices may be specified to be different than a previous route from a source device to target device, or a combination of workload, workload target, and intermediary devices may be modified or migrated.

In this way, as depicted in FIG. 2D after balancing, path (210-B), which represents a path that includes {level 3 switch (203-1), level 2 switch (202-1), level 1 switch (201-1), rack (200-1)}, may correspond to a communication path or route that is utilized in satisfying an access from the first workload to the first workload target. Similarly, path (212-B), which represents a path that includes {level 3 switch (203-2), level 2 switch (202-2), level 1 switch (201-2), rack (200-2)}, may correspond to a communication path or route that is utilized in satisfying an access from a second workload to a second workload target; and path (214-B), which represents a path that includes {level 3 switch (203-X), level 2 switch (202-(Y−1)), level 1 switch (201-(Z−1)), rack (200-Q)}, may correspond to a communication path or route that is utilized in satisfying an access from a third workload to a third workload target.

After balancing, balanced topology utilization table (290) may be set to zeroes (0) for the "Utilization" measure, and may then be updated when new communication path data is received. In this example, table (29) may represent utilization of the infrastructure of the NCE (208) given three accesses, from the first workload to the first workload target, from the second workload to the second workload target, and from the third workload to the third workload target. In other cases, some source devices, target devices, or both, may still be shared among different workload to workload target access, and the table (290) may then have "Utilization" values other than zero.

Continuing with this example, table (290) may represent the network topology and utilization of the infrastructure of the NCE of after balancing as depicted in FIG. 2B. Specifically, an access from the first workload to a first workload target may correspond to path (210-B), and may correspond to "Utilization" entries in table (290) corresponding to path (210-B) utilizing a communication link from ancestor switch (203-1) to descendant switch (202-1), a communication link from ancestor switch (202-2) to descendant switch (201-1), and ancestor switch (201-1) to descendant rack (200-1), corresponding, respectively, to rows (250), (252), and (254). The remaining rows of table (290) similarly represent the accesses of the second workload to the second workload target, and the third workload to the third workload target.

As depicted in FIGS. 2A and 2B, a networked computing environment (208) may be accessed over a network (205), which may be any type of network, including the Internet. Further in this example, the NCE (208) may be accessed by multiple different hosts (206), which may include any type of computing device, including desktop computers, handheld computers, electronic reading devices, mobile telephones, or more generally, and device capable of communicating over a network to make a request for access to data or services.

There may be different numbers of levels and different numbers of connections in a given network topology representing a networked computing environment (208). In some examples, there may a network topology that is not organized according to levels, where each given device may be connected to any other one or more devices such that a data communication path is provided from a workload to a workload target. The network topology may be hierarchically organized, where different devices at different levels may have difference characteristics, such as different performance characteristics.

As depicted, the network management device (101) may be implemented within the NCE (208) as a stand-alone device in communication with one or more of the devices in the network topology. However, the functionality of the network management device (101) may be included within one or more of the devices that are part of the network topology.

Figure 3A:
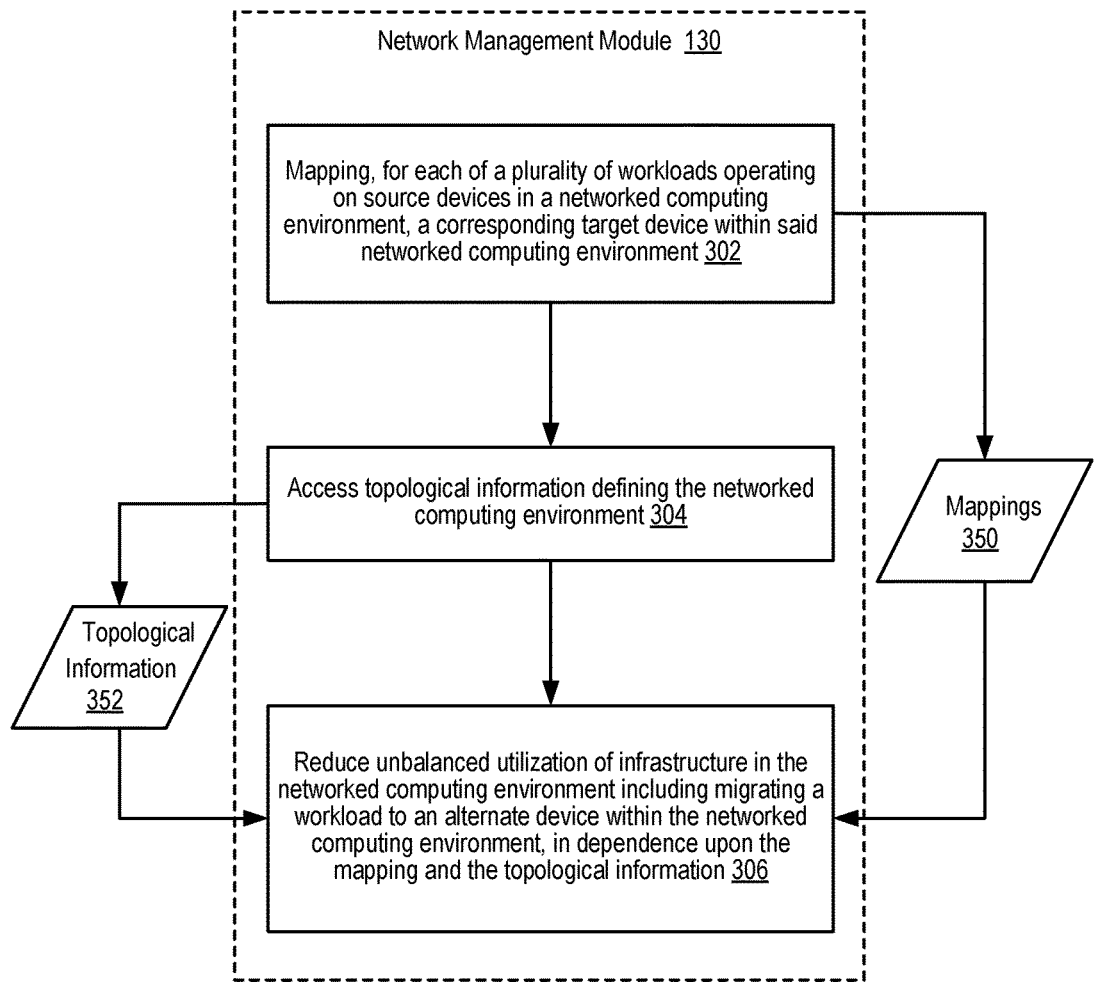
FIGS. 3A and 3B depict flow charts illustrating embodiments of methods for balancing utilization of infrastructure in a networked computing environment.

FIG. 3A, for further explanation, depicts a flow chart illustrating an embodiment of a method for balancing utilization of infrastructure in an NCE. The method of FIG. 3A may be carried out by a network management module (130) within a network management device (101).

The method of FIG. 3A includes: mapping (302), for each of a plurality of workloads operating on source devices in a networked computing environment, a corresponding target device within said networked computing environment; accessing (304) topological information (352) defining the networked computing environment; and reducing (316) unbalanced utilization of infrastructure in the networked computing environment, where the reducing (316) may include migrating a workload to an alternate device within the networked computing environment, where the migrating is in dependence upon the mapping and topological information.

Similar to the above discussion with regard to FIGS. 2A-2C, mapping (302) may include determining a mapping of a source device to a target device, where the determination of the mapping may be performed using different techniques. For example, a mapping of a source device to a target device may be determined based on a correspondence to a route through devices corresponding to a previous data communication for an access from a workload to a workload target—where a source device may be the first device along the route and the target device may be the last device along the route, or a source device may be a device on which a workload executes. An example of this mapping data is illustrated in unbalanced mapping table (220). Further in this example, this mapping data may be determined based on the network management device (101) tracking accesses from workloads to workload devices. In other example, the network management device (101) may receive indications of routes for data communications, and use this route information to determine mappings between a source device and a target device for a given access from a corresponding workload to a workload target.

Accessing (304) topological information may include obtaining topological information generated from a network management device, from stored configuration data, or may be performed using different techniques as noted above with regard to the discussion of FIGS. 2A-2D. As one example, the network management device (101) may access a configuration file describing each device and connection between devices. As another example, the network management device (101) may construct a table representing a network topology based at least in part on data communications and corresponding routing information among the devices of the NCE (208).

The topological information defining the topology of the NCE may be obtained from a table representing a graph corresponding to the network topology, similar to tables (280) and (290) with or without the "Utilization" field.

Reducing (306) unbalanced utilization of infrastructure in the NCE may be carried out using different techniques, as noted above with regard to the discussion of FIG. 2A-2D. For example, as discussed above with regard to FIG. 2C, the network management device (101) may reduce unbalanced utilization of infrastructure in the NCE based at least on the mappings of source devices to target devices, as depicted in FIG. 2C, and also based at least on the topological information (352).

In this example, the topological information (352) may be used to determine which other source devices, target devices, or routes through intermediary devices, may be available for remapping such that workload on previously mapped devices are at least partially offloaded onto newly mapped devices. In other cases, a mapping between source devices and target devices may remain unchanged, however, routing of the intermediary devices may be updated to remove or reduce shared routes and loading or utilization of intermediary device. In other words, as discussed above with regard to FIGS. 2A-2C, an example of reducing (306) of unbalanced utilization of infrastructure may include migrating of workloads, workload targets, modifying routes between workloads, or migrated workloads and workload targets, or migrated workload targets, or some combination of these operations.

Figure 3B:
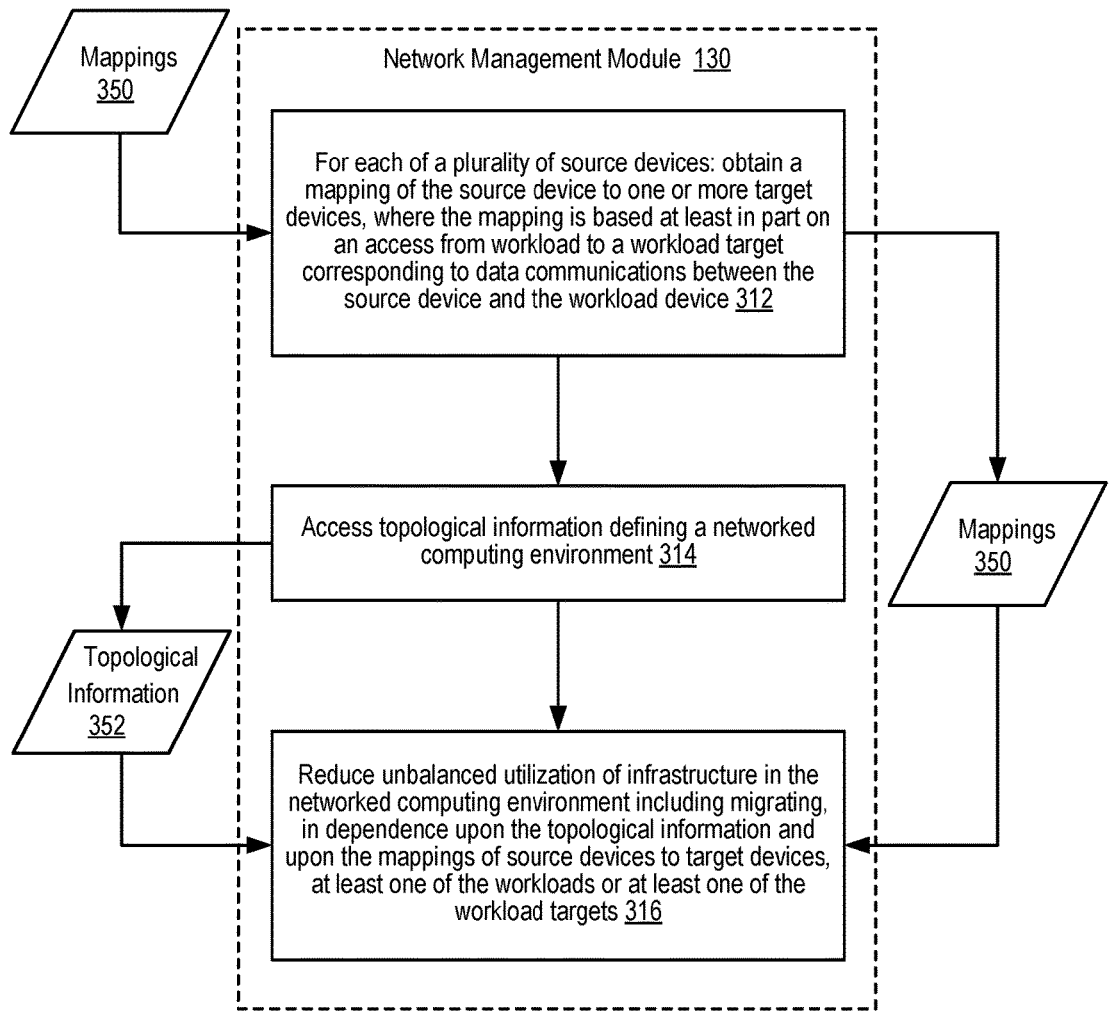

FIG. 3B, for further explanation, depicts a flow chart illustrating an embodiment of a method for balancing utilization of infrastructure in an NCE. The method of FIG. 3B may be carried out by a network management module (130) within a network management device (101).

The method of FIG. 3B includes: for each of a plurality of source devices, obtaining (312) a mapping (350) of a source device to a target device, where the mapping is based at least in part on an access from a workload to a workload target corresponding to data communication between the source device and the target device; accessing (314) topological information (352) defining the networked computing environment; and reducing (316) unbalanced utilization of infrastructure in the NCE (208), where the reducing (316) may include migrating, in dependence upon the mappings of source devices to target devices, at least one of the workloads or at least one of the workload targets.

Similar to the above discussion with regard to FIGS. 2A-2C, obtaining (312) a mapping may include determining a mapping of a source device to a target device, where the determination of the mapping may be performed using different techniques. For example, a mapping of a source device to a target device may be determined based on a correspondence to a route through devices corresponding to a previous data communication for an access from a workload to a workload target—where a source device may be the first device along the route and the target device may be the last device along the route. An example of this mapping data is illustrated in unbalanced mapping table (220). Further in this example, this mapping data may be determined based on the network management device (101) tracking accesses from workloads to workload devices. In other example, the network management device (101) may receive indications of routes for data communications, and use this route information to determine mappings between a source device and a target device for a given access from a corresponding workload to a workload target.

Accessing (314) topological information may include obtaining topological information generated from a network management device, from stored configuration data, or may be performed using different techniques as noted above with regard to the discussion of FIGS. 2A-2D. As one example, the network management device (101) may access a configuration file describing each device and connection between devices. As another example, the network management device (101) may construct a table representing a network topology based at least in part on data communications and corresponding routing information among the devices of the NCE (208).

The topological information defining the topology of the NCE may be obtained from a table representing a graph corresponding to the network topology, similar to tables (280) and (290) with or without the "Utilization" field.

Reducing (316) an unbalanced utilization of infrastructure in the NCE (208) may be performed using different techniques, as noted above with regard to the discussion of FIG. 2A-2D. For example, as discussed above with regard to FIG. 2C, the network management device (101) may reduce unbalanced utilization of infrastructure in the NCE based at least on the mappings of source devices to target devices, as depicted in FIG. 2C, and also based at least on the topological information (352).

In this example, the topological information (352) may be used to determine which other source devices, target devices, or routes through intermediary devices, may be available for remapping such that workload on previously mapped devices are at least partially offloaded onto newly mapped devices. In other cases, a mapping between source devices and target devices may remain unchanged, however, routing of the intermediary devices may be updated to remove or reduce shared routes and loading or utilization of intermediary device. In other words, as discussed above with regard to FIGS. 2A-2C, an example of reducing (316) of unbalanced utilization of infrastructure may include migrating of workloads, workload targets, modifying routes between workloads, or migrated workloads and workload targets, or migrated workload targets, or some combination of these operations.

Figure 4:
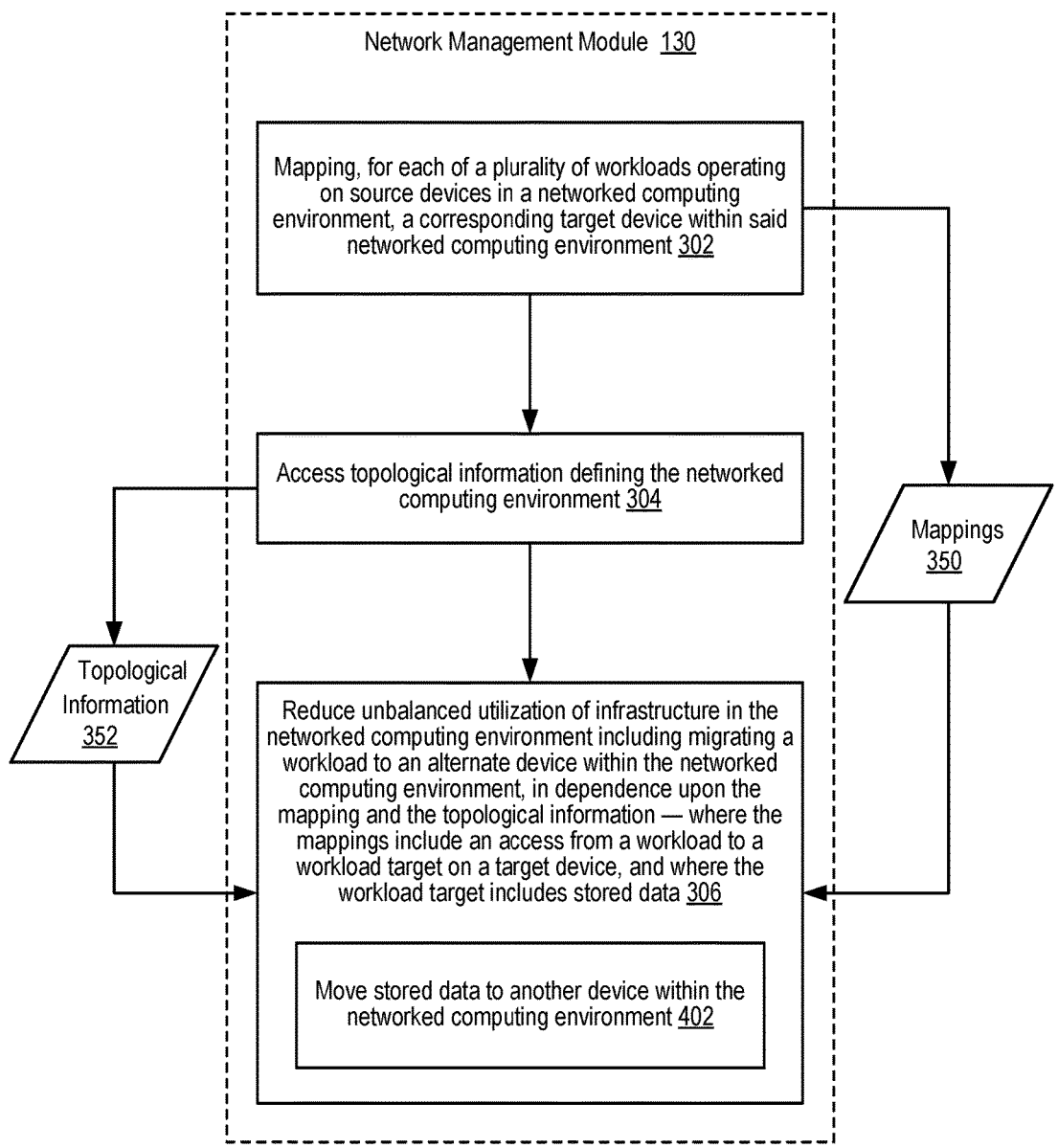
FIG. 4 depicts a flow chart illustrating another embodiment of a method for balancing utilization of infrastructure in a networked computing environment.

Turning now to FIG. 4, the method of FIG. 4 is similar to the method of FIG. 3 in that the method of FIG. 3 includes: mapping (302), for each of a plurality of workloads operating on source devices in a networked computing environment, a corresponding target device within said networked computing environment; accessing (304) topological information (352) defining the networked computing environment; and reducing (316) unbalanced utilization of infrastructure in the networked computing environment, where the reducing (316) may include migrating a workload to an alternate device within the networked computing environment, where the migrating is in dependence upon the mapping and topological information.

However, the method of FIG. 4 differs from the method of FIG. 3 in that the method of FIG. 4 includes: moving (402) data corresponding to a workload target from one device within the NCE (208) to another device within the NCE (208).

As discussed above with regard to FIGS. 2A-2D and 3, migrating (402) a workload target from one device, for example a target device, to another device within the NCE may eliminate a single target device being mapped to more than one mapping entry within a mapping table (220), which would result in a more balanced utilization of the infrastructure of the NCE since different workload accesses to workload targets would use different devices. Further, given the use of different devices for different workload accesses of workload targets would also allow the networked management device (101) greater flexibility in scheduling jobs, including allowing for greater parallelization.

Figure 5:
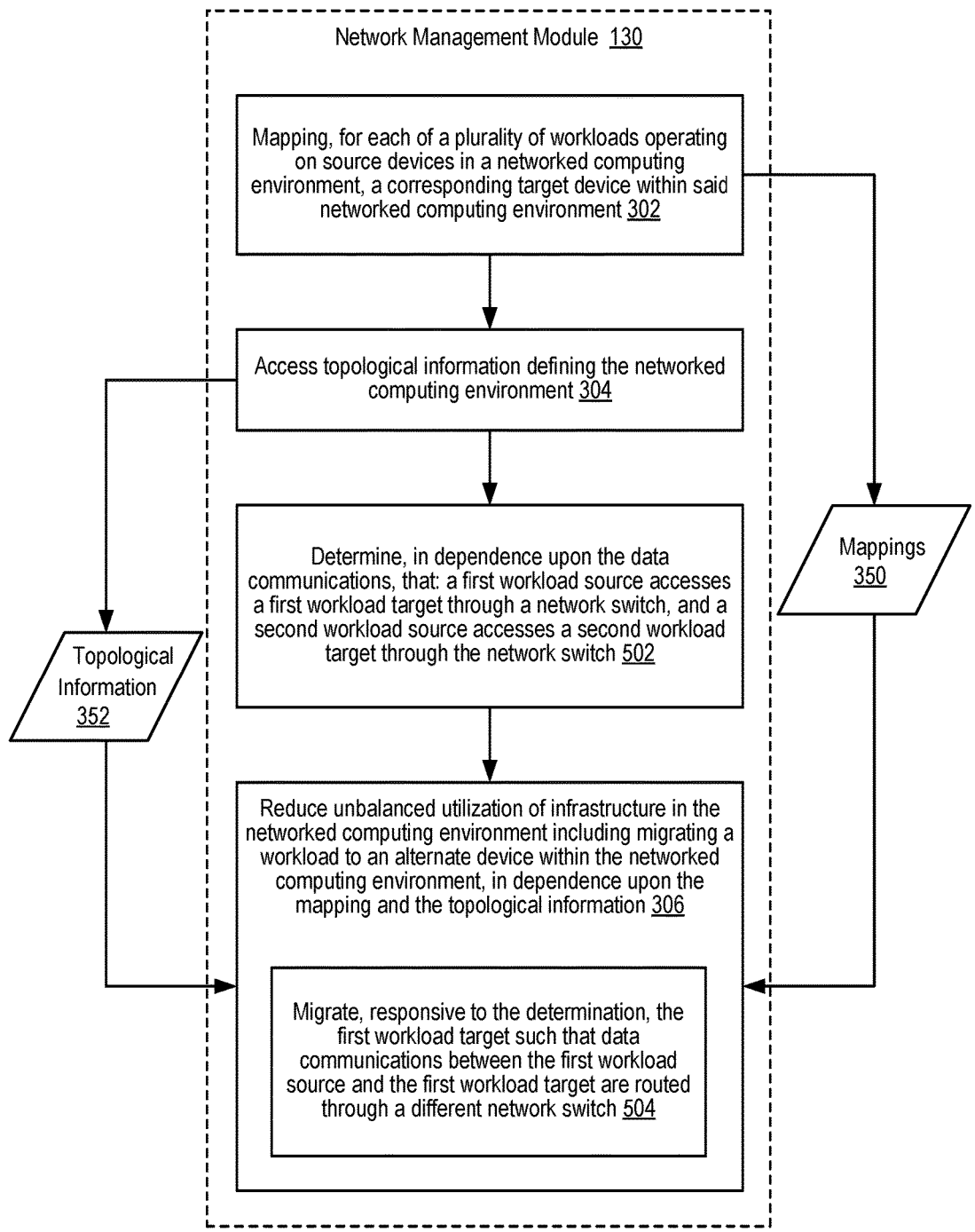
FIG. 5 depicts a flow chart illustrating another embodiment of a method for balancing utilization of infrastructure in a networked computing environment.

Turning now to FIG. 5, the method of FIG. 5 is similar to the method of FIG. 3 in that the method of FIG. 5 includes: mapping (302), for each of a plurality of workloads operating on source devices in a networked computing environment, a corresponding target device within said networked computing environment; accessing (304) topological information (352) defining the networked computing environment; and reducing (316) unbalanced utilization of infrastructure in the networked computing environment, where the reducing (316) may include migrating a workload to an alternate device within the networked computing environment, where the migrating is in dependence upon the mapping and topological information.

However, the method of FIG. 5 differs from the method of FIG. 3 in that the method of FIG. 5 includes: determining (502), in dependence upon the data communications, that a first workload accesses a first workload target through a network switch, and a second workload accesses a second workload target through the network switch. Further, in the method of FIG. 5, reducing (306) unbalanced utilization of infrastructure in the NCE (208) may include migrating (504), responsive to the determining (502), the first workload target such that data communications between the first workload and the first workload target are routed through a different network switch.

As discussed above with regard to FIGS. 2A-2D and 3, migrating (402) a workload target from one device to another device may include updating routing information specifying a network path from a source device to a target device. In this example, whether or not a source device or target device is different after balancing, a route that included particular intermediary devices prior to balancing may include a different route with different intermediary devices, such as a network switch, after balancing.

Figure 6:
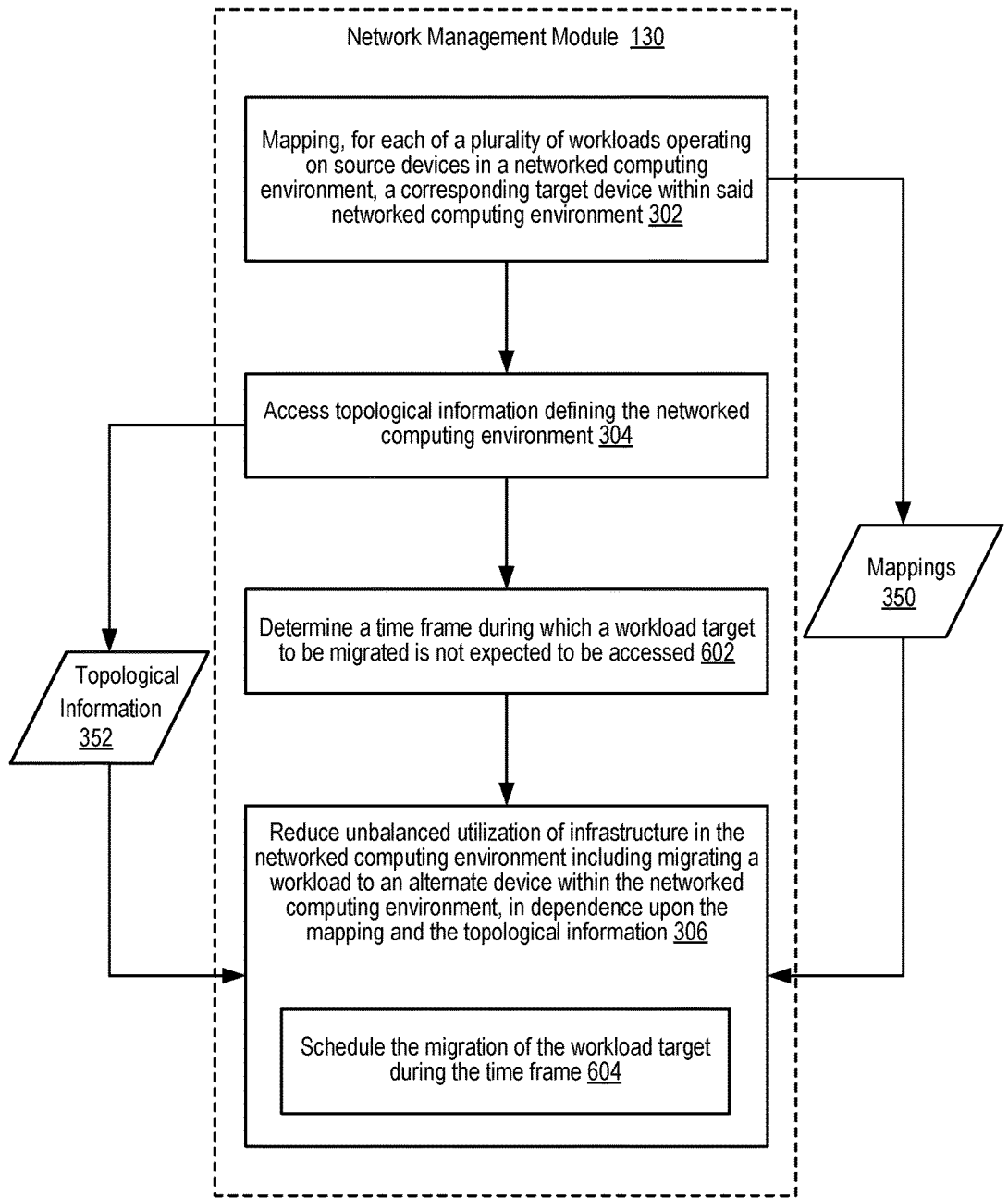
FIG. 6 depicts a flow chart illustrating another embodiment of a method for balancing utilization of infrastructure in a networked computing environment.

Turning now to FIG. 6, the method of FIG. 6 is similar to the method of FIG. 3 in that the method of FIG. 6 includes: mapping (302), for each of a plurality of workloads operating on source devices in a networked computing environment, a corresponding target device within said networked computing environment; accessing (304) topological information (352) defining the networked computing environment; and reducing (316) unbalanced utilization of infrastructure in the networked computing environment, where the reducing (316) may include migrating a workload to an alternate device within the networked computing environment, where the migrating is in dependence upon the mapping and topological information.

However, the method of FIG. 6 differs from the method of FIG. 3 in that the method of FIG. 6 includes determining (602) a time frame during which a workload target to be migrated is not expected to be accessed. Further, in the method of FIG. 6 reducing (306) unbalanced utilization of infrastructure in the NCE (208) may include scheduling (604) the migration of the workload target during the time frame.

Determining (602) a time frame during which a workload target to be migrated is not expected to be accessed may be done using different techniques. For example, the network management device (101) may record or track data describing historical usage of a given workload target, including previous durations of access, previous times at which the workload target was accessed, among other information. In this way, the network management device (101) may determine average durations of access and a pattern describing times of day that the workload target is accessed. In some cases, the network management device (101) may simply refer to a single previous access of the workload target and use this previous access as a basis for determining an expected time frame. In this way, the network management device (101) may reduce the likelihood that an access may be received during a migration of a workload target, and thereby reducing the likelihood that an access may be delayed during a migration.

Figure 7:
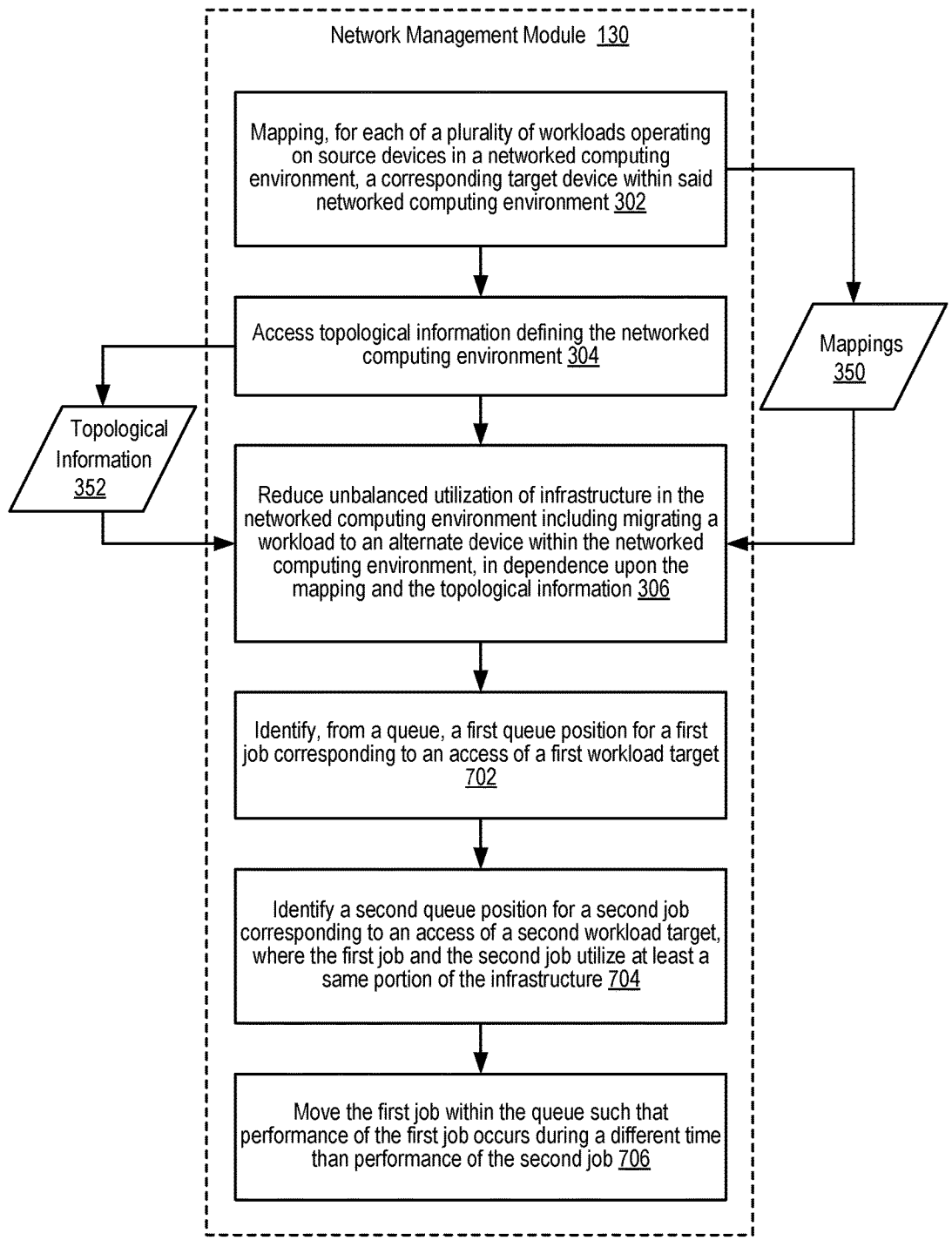
FIG. 7 depicts a flow chart illustrating another embodiment of a method for balancing utilization of infrastructure in a networked computing environment.

Turning now to FIG. 7, the method of FIG. 7 is similar to the method of FIG. 3 in that the method of FIG. 7 includes: mapping (302), for each of a plurality of workloads operating on source devices in a networked computing environment, a corresponding target device within said networked computing environment; accessing (304) topological information (352) defining the networked computing environment; and reducing (316) unbalanced utilization of infrastructure in the networked computing environment, where the reducing (316) may include migrating a workload to an alternate device within the networked computing environment, where the migrating is in dependence upon the mapping and topological information.

However, the method of FIG. 7 differs from the method of FIG. 3 in that the method of FIG. 7 includes: identifying (702), from a queue, a first queue position for a first job corresponding to an access of a first workload target; identifying (704) a second queue position for a second job corresponding to an access of a second workload target, where the first job and the second job utilize at least a same portion of infrastructure; and moving (706) the first job within the queue such that performance of the first job occurs during a different time than performance of the second job.

As discussed above with regard to FIG. 6, the network management device (101) may record or track data describing historical usage of a given workload target, including previous durations of access, previous times at which the workload target was accessed, among other information. In this way, the network management device (101) may determine average durations of access and a pattern describing times of day that the workload target is accessed and store, in a data object, characterizations of accesses from workloads to workload targets.

In this example, the network management device (101) may analyze a queue to determine whether any conflicts of resource usage of the infrastructure of the NCE (208) may be avoided or reduced. For example, the networked computing device (101) may, identifying (702) a first job in a queue and identifying (704) a second job in a queue, and based on the characterizations of the accesses described above, determine that the first job and the second job may utilize one or more of the same resources. In response to such a determination of shared resources of the first job and the second job, the network management device (101) may move (706) either the first job, the second job, or both jobs, such that when the first job is dequeued from the queue, performance of the first job may not interfere with performance of the second job in the queue when the second job is dequeued.

Figure 8:
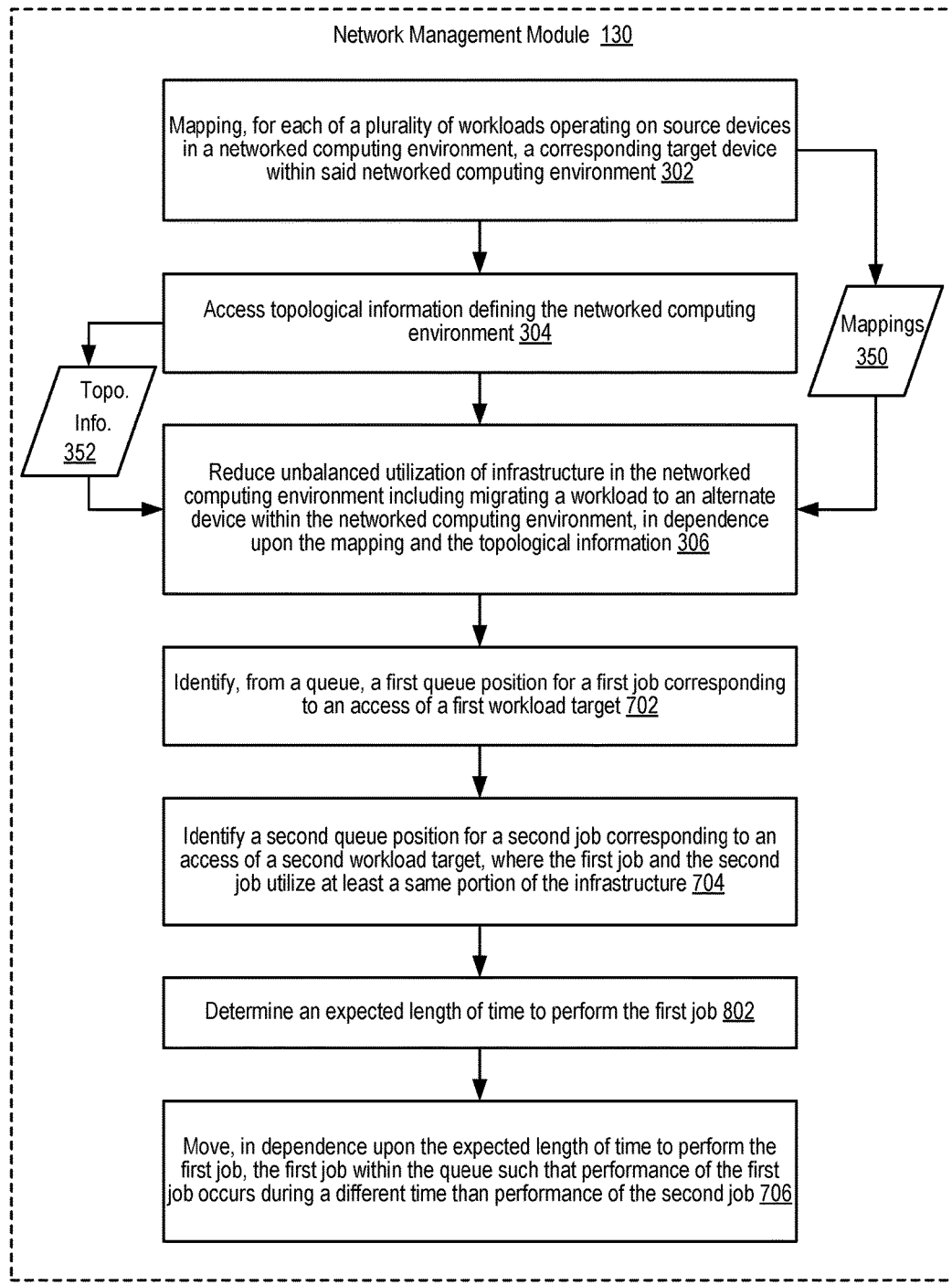
FIG. 8 depicts a flow chart illustrating another embodiment of a method for balancing utilization of infrastructure in a networked computing environment.

Turning now to FIG. 8, the method of FIG. 8 is similar to the method of FIG. 7 in that the method of FIG. 8 includes: mapping (302), for each of a plurality of workloads operating on source devices in a networked computing environment, a corresponding target device within said networked computing environment; accessing (304) topological information (352) defining the networked computing environment; and reducing (316) unbalanced utilization of infrastructure in the networked computing environment, where the reducing (316) may include migrating a workload to an alternate device within the networked computing environment, where the migrating is in dependence upon the mapping and topological information; identifying (702), from a queue, a first queue position for a first job corresponding to an access of a first workload target; identifying (704) a second queue position for a second job corresponding to an access of a second workload target, where the first job and the second job utilize at least a same portion of infrastructure; and moving (706) the first job within the queue such that performance of the first job occurs during a different time than performance of the second job.

However, the method of FIG. 8 differs from the method of FIG. 7 in that the method of FIG. 8 includes: determining (802) an expected length of time to perform the first job.

As discussed above with regard to FIG. 7, the network management device (101) may record or track data describing historical usage of a given workload target, including previous durations of access, previous times at which the workload target was accessed, among other information. In this way, the network management device (101) may determine (802) average durations of access and a pattern describing times of day that the workload target is accessed and store, in a data object, characterizations of accesses from workloads to workload targets.

As further described above with regard to FIG. 7, this information on expected job duration may be used as a basis for moving (706) a given job, such as the first job in this example, within the queue such that when the first job is dequeued from the queue, performance of the first job may not interfere with performance of the second job in the queue when the second job is dequeued.

The disclosed embodiments are described largely in the context of a fully functional computer system for balancing utilization of infrastructure in an NCE. Readers of skill in the art will recognize, however, that the disclosed embodiments may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the disclosed methods as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

The disclosed embodiments for balancing utilization of infrastructure in an NCE may be a system, a method, and/or a computer program product. The computer program product may include a computer readable storage medium (or media) having computer readable program instructions thereon for causing a processor to carry out features and aspects of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform features and aspects of the disclosed embodiments.

The disclosed embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method comprising:
   by computer program instructions executing on a computing device:
   mapping, for each of a plurality of workloads operating on source devices in a networked computing environment, a corresponding target device within said networked computing environment, wherein mapping includes each intermediary device in a route between devices in the networked computing environment, wherein the source devices and the corresponding target device are functioning devices;
   accessing topological information defining the networked computing environment in order to determine utilization of network communication infrastructure in the networked computing environment for each source device and target device; and reducing unbalanced utilization of infrastructure in the networked computing environment using utilization information from the accessed topological information including migrating a workload to an alternate device within the networked computing environment, in dependence upon the mapping and the topological information, wherein unbalanced utilization of infrastructure includes consideration of usage of each intermediary device in the route between devices in the networked computing environment, including:
determining, in dependence upon the data communications, that:
a first workload accesses a first workload target through a network switch, and
a second workload accesses a second workload target through the network switch;
wherein migrating at least one of the workloads or at least one of the workload targets further comprises:
migrating, responsive to the determination, the first workload target such that data communications between the first workload and the first workload target are routed through a different network switch,
thereby improving balancing utilization of infrastructure in the networked computing environment.

2. The method of claim 1, wherein the mappings are based at least in part on an access from a workload to a workload target on a target device, and wherein the workload target comprises stored data, and said migrating further comprises:
moving said stored data to another target device within the networked computing environment.

3. The method of claim 2, further comprising:
determining a time frame during which a workload target to be migrated is not expected to be accessed; and
wherein migrating at least one of the workloads or at least one of the workload targets further comprises:
scheduling the migration of the workload target during the time frame.

4. The method of claim 2, further comprising:
identifying, from a queue, a first queue position for a first job corresponding to an access of a first workload target;
identifying a second queue position for a second job corresponding to an access of a second workload target, wherein the first job and the second job utilize at least a same portion of the infrastructure; and
moving the first job within the queue such that performance of the first job occurs during a different time than performance of the second job.

5. The method of claim 4, further comprising:
determining an expected length of time to perform the first job;
wherein moving the first job within the queue further comprises:
moving the first job within the queue in dependence upon the expected length of time to perform the first job.

6. The method of claim 1, wherein prior to migrating at least one of the workloads or at least one of the workload targets, the first workload target and the second workload target are both stored on a storage device, and wherein after migrating at least one of the workloads or at least one of the workload targets, the first workload target and the second workload target are stored on different storage devices.

7. An apparatus comprising a computer processor, a non-transitory computer memory operatively coupled to the computer processor, the non-transitory computer memory having disposed within it computer program instructions that, when executed by the computer processor, cause the apparatus to carry out the steps of:
mapping, for each of a plurality of workloads operating on source devices in a networked computing environment, a corresponding target device within said networked computing environment, wherein mapping includes each intermediary device in a route between devices in the networked computing environment, wherein the source devices and the corresponding target device are functioning devices;
accessing topological information defining the networked computing environment in order to determine utilization of network communication infrastructure in the networked computing environment for each source device and target device; and
reducing unbalanced utilization of infrastructure in the networked computing environment using utilization information from the accessed topological information including migrating a workload to an alternate device within the networked computing environment, in dependence upon the mapping and the topological information, wherein unbalanced utilization of infrastructure includes consideration of usage of each intermediary device in the route between devices in the networked computing environment, including:
determining, in dependence upon the data communications, that:
a first workload accesses a first workload target through a network switch, and
a second workload accesses a second workload target through the network switch;
wherein migrating at least one of the workloads or at least one of the workload targets further comprises:
migrating, responsive to the determination, the first workload target such that data communications between the first workload and the first workload target are routed through a different network switch,
thereby improving balancing utilization of infrastructure in the networked computing environment.

8. The apparatus of claim 7, wherein the mappings are based at least in part on an access from a workload to a workload target on a target device, and wherein the workload target comprises stored data, and said migrating further comprises:
moving said stored data to another target device within the networked computing environment.

9. The apparatus of claim 8, wherein the steps further comprise:
determining a time frame during which a workload target to be migrated is not expected to be accessed; and
wherein migrating at least one of the workloads or at least one of the workload targets further comprises:
scheduling the migration of the workload target during the time frame.

10. The apparatus of claim 8, wherein the steps further comprise:
identifying, from a queue, a first queue position for a first job corresponding to an access of a first workload target;
identifying a second queue position for a second job corresponding to an access of a second workload target, wherein the first job and the second job utilize at least a same portion of the infrastructure; and moving the first job within the queue such that performance of the first job occurs during a different time than performance of the second job.

11. The apparatus of claim 10, wherein the steps further comprise:
determining an expected length of time to perform the first job;
wherein moving the first job within the queue further comprises:
moving the first job within the queue in dependence upon the expected length of time to perform the first job.

12. The apparatus of claim 7, wherein prior to migrating at least one of the workloads or at least one of the workload targets, the first workload target and the second workload target are both stored on a storage device, and wherein after migrating at least one of the workloads or at least one of the workload targets, the first workload target and the second workload target are stored on different storage devices.

13. A computer program product disposed upon a non-transitory, computer-readable medium, the computer program product comprising computer program instructions that, when executed, cause a computer to carry out the steps of:
mapping, for each of a plurality of workloads operating on source devices in a networked computing environment, a corresponding target device within said networked computing environment, wherein mapping includes each intermediary device in a route between devices in the networked computing environment, wherein the source devices and the corresponding target device are functioning devices;
accessing topological information defining the networked computing environment in order to determine utilization of network communication infrastructure in the networked computing environment for each source device and target device; and
reducing unbalanced utilization of infrastructure in the networked computing environment using utilization information from the accessed topological information including migrating a workload to an alternate device within the networked computing environment, in dependence upon the mapping and the topological information, wherein unbalanced utilization of infrastructure includes consideration of usage of each intermediary device in the route between devices in the networked computing environment, including:
determining, in dependence upon the data communications, that:
a first workload accesses a first workload target through a network switch, and
a second workload accesses a second workload target through the network switch;
wherein migrating at least one of the workloads or at least one of the workload targets further comprises:
migrating, responsive to the determination, the first workload target such that data communications between the first workload and the first workload target are routed through a different network switch,
thereby improving balancing utilization of infrastructure in the networked computing environment.

14. The computer program product of claim 13, wherein the mappings are based at least in part on an access from a workload to a workload target on a target device, and wherein the workload target comprises stored data, and said migrating further comprises:
moving said stored data to another target device within the networked computing environment.

15. The computer program product of claim 14, wherein the steps further comprise:
determining a time frame during which a workload target to be migrated is not expected to be accessed; and
wherein migrating at least one of the workloads or at least one of the workload targets further comprises:
scheduling the migration of the workload target during the time frame.

16. The computer program product of claim 14, wherein the steps further comprise:
identifying, from a queue, a first queue position for a first job corresponding to an access of a first workload target;
identifying a second queue position for a second job corresponding to an access of a second workload target, wherein the first job and the second job utilize at least a same portion of the infrastructure; and
moving the first job within the queue such that performance of the first job occurs during a different time than performance of the second job.

17. The computer program product of claim 13, wherein prior to migrating at least one of the workloads or at least one of the workload targets, the first workload target and the second workload target are both stored on a storage device, and wherein after migrating at least one of the workloads or at least one of the workload targets, the first workload target and the second workload target are stored on different storage devices.

* * * * *